(No Model.)
J. A. BARRETT.
ELECTRIC CABLE.
No. 482,328. Patented Sept. 6, 1892.
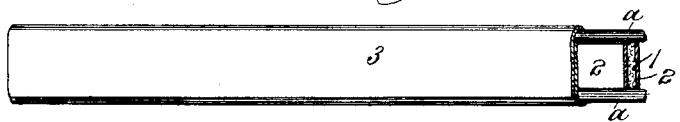
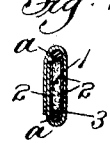
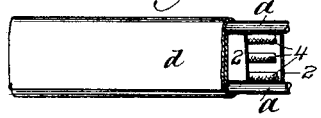
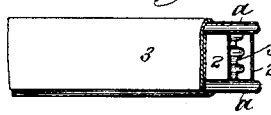
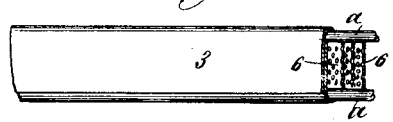
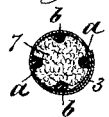
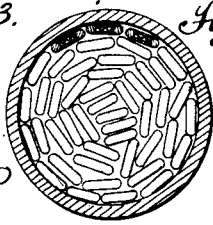
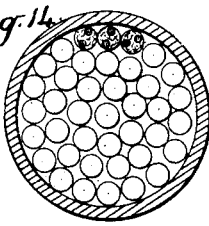
Attest:
Geo H Botts
C. J. Sawyer
Inventor:
John A. Barrett
by
Philipp, Munson & Phelps
Attys
THE NORRIS PETERS CO., PHOTO-LITHO., WASHINGTON, D. C.

United States Patent Office.

JOHN A. BARRETT, OF BROOKLYN, NEW YORK, ASSIGNOR TO THE STANDARD UNDERGROUND CABLE COMPANY, OF PITTSBURG, PENNSYLVANIA.

ELECTRIC CABLE.

SPECIFICATION forming part of Letters Patent No. 482,328, dated September 6, 1892.

Application filed August 28, 1891. Serial No. 403,962. (No model.)

*To all whom it may concern:*

Be it known that I, JOHN A. BARRETT, a citizen of the United States, residing at Brooklyn, in the county of Kings and State of New York, have invented certain new and useful Improvements in Electric Conductors, fully described and represented in the following specification and the accompanying drawings, forming a part of the same.

This invention relates to the manufacture of insulated electric conductors, and especially to the construction of electric circuits composed of a pair of conductors forming the two branches of the circuit and electric cables composed of a number of such circuits, its object being to provide an improved construction by which the inductive capacity of the conductors and retardation resulting therefrom is reduced.

It is well known that the inductive capacity of electric conductors is lowest when they are insulated by dry air, and this dry-air insulation has been provided in many ways. It is found in practice, also, that it is convenient to form the circuits in single strands containing one or more circuits, these strands being grouped together to form the cable, the circuits thus being conveniently handled as a single construction, and it is important that the branch conductors be held in fixed positions relatively to each other, so that the proper distribution of space in the cables, as determined in making the circuits by the relative amounts of insulation between and about the conductors, may be maintained. It is desirable, therefore, that the conductors forming the circuits of the cable be insulated to form a single strand with the conductors held at a fixed distance apart and that the insulation be of such a character as to provide a large amount of air-space and to permit the insulation between and outside the conductors to be readily adjusted, as desired, in making the circuits. I attain the desired result by employing a core of insulating material having air-spaces and placing the conductors of the circuit upon opposite sides of the same so as to be separated by the thickness of the core, the conductor and core being secured together so as to form a single construction. The core may be of any form and of any suitable construction and the conductors may be secured to the same in any suitable manner, preferably by insulation surrounding the core and conductors and binding them together.

In the accompanying drawings, forming a part of this specification, in which I have shown some of the preferred forms of construction in which my invention may be embodied, Figure 1 is a broken plan of a circuit having a woven or braided core. Fig. 2 is a section of the same. Figs. 3 and 4, 5 and 6, 7 and 8, 9 and 10, and 11 and 12, respectively, by pairs, are views similar to Figs. 1 and 2, showing modified constructions. Figs. 13 and 14 are cross-sections of cables embodying my invention.

In the construction shown in Figs. 1 and 2 the core consists of a piece of loosely woven or braided material 1 placed between the two conductors *a* of the circuit and of such a width as to separate the conductors the required distance to secure the proper distribution of space in the cable when the circuits are grouped.

To secure the conductors and core together and hold the conductors in place, binding-strips 2 are applied outside of the core, preferably of such width as to extend approximately the full distance between the conductors and a covering of paper 3, applied about the core, and conductors and binding-strip, this covering consisting, as shown, of a strip wrapped about the core and conductors straight. The binding-strips 2 are preferably gummed to the core 1 and the wrapper 3 gummed to the binding-strips, so that all the parts are held together in a single construction with the conductors firmly held as positioned. Any other suitable means for securing the parts together may be used.

While loosely woven or braided material, as above described, may be used in forming my improved cable construction, a very efficient construction with large air-space may be formed by making the core of a hollow structure, providing fixed air-space between the conductors, by which I mean and intend to cover any arrangement of material by which an open air-space or air-spaces are formed between the conductors and which is of sufficient rigidity to hold the conductors in position and preserve the air space or spaces in fixed or defined positions, as distinguished from a construction consisting of conductors supported upon a cord or similar core of woven or braided material; and my invention consists, in part, of a circuit thus constructed, the hollow structure preferably being formed of paper or similar cheap insulating material.

In the construction shown in Figs. 3 and 4 the core is formed by a series of cords 4, arranged parallel with the conductors and separated, so as to leave air-spaces between them and between the binding-strips 2 of the construction previously described, which are gummed to the cords, the wrapping 3 being applied as before.

In Figs. 5 and 6 the core is formed of a strip of corrugated paper 5 of suitable width to hold the conductors at the proper distance apart, the binding-strips 2 being preferably used, as shown, these strips and the wrapping 3 being applied as before.

In Figs. 7 and 8 the core consists of a series of perforated strips of paper 6, which are laid on each other to the required thickness, the binding-strips 2 being omitted in this case, but the wrapping applied as before.

While I prefer the constructions thus far shown and described, in which oblong or flat cores are used with the branch conductors secured at the opposite edges of the core, as such circuits pack more closely in the cable and the conductors of the same circuit are separated a greater distance with the same total amount of insulation than with other forms of cores, this is not essential to the present invention, broadly considered; but the core and circuit may be of any form desired. Thus I have shown in Figs. 9 and 10 a construction in which a cylindrical core is employed and a circuit of substantially cylindrical form produced, the core being shown as consisting of a body of loosely woven or braided material 7, as in the construction shown in Figs. 1 and 2, and the paper wrapper 3 being applied spirally to secure the core and conductors together.

While it will generally be found preferable to use a separate core for each circuit, two or more circuits may be mounted upon the same core to form a single strand, if preferred. Thus I have shown in Figs. 11 and 12 a construction similar to Figs. 9 and 10, except that two circuits *a b* are secured upon the core in such a manner that the conductors of the same circuit are diametrically opposite each other.

In Figs. 13 and 14 I have shown in cross-section cables of two constructions embodying my invention, Fig. 13 showing a cable formed of circuits of the construction shown in Figs. 5 and 6, and Fig. 14 a cable composed of circuits of the construction shown in Figs. 9 and 10.

It will be understood that my invention is not to be limited to any of the constructions shown; but that any other suitable construction of core having air-spaces may be used in my improved cable construction and that the conductors and core may be secured together in any other suitable manner.

The circuit and cable of the special oblong form shown in Figs. 1 to 8 and 13 and the circuit wrapped as shown therein are claimed in my application, Serial No. 399,798, filed July 17, 1891.

By the term "sheath" used in the claims I mean and intend to cover not only the covering of lead usually designated in the art by the term "sheath," but also any covering having the same function of holding the circuits in a compact group and preventing the access of air thereto, so as to preserve dry-air insulation within the air-spaces provided by the cores.

What I claim is—

1. The combination, with electric conductors forming one or more circuits, of a core upon which the conductors are secured at a distance from each other, said core consisting of a hollow structure constructed to provide fixed space for dry-air insulation between said conductors, substantially as described.

2. The combination, with electric conductors forming one or more circuits, of a core upon which said conductors are arranged at a distance from each other and insulating material binding said core and conductors together, said core consisting of a hollow structure constructed to provide fixed space for dry-air insulation between said conductors, substantially as described.

3. A single-strand anti-induction electric circuit consisting of a core and one or more electric circuits thereon, each circuit consisting of a pair of conductors arranged on opposite sides of said core, and a covering of insulating material binding the core and conductors together, said core consisting of a hollow structure constructed to provide fixed space for dry-air insulation between the conductors, substantially as described.

4. The combination, with electric conductors forming one or more circuits, of a core consisting of a hollow structure, of paper or similar insulating material, upon which the conductors are secured at a distance from each other, substantially as described.

5. In an electric cable, the combination, with an inclosing sheath, of a plurality of single-strand electric circuits, each circuit consisting of an oblong core of insulating material, and electric conductors forming a circuit secured on the core at the opposite edges of the same, said core being constructed to provide space for dry-air insulation between the conductors, substantially as described.

6. In an electric cable, the combination, with an inclosing sheath, of a plurality of cores and electric conductors forming one or more circuits secured in position upon each core, said cores being constructed to provide space for dry-air insulation between the conductors, substantially as described.

7. In an electric cable, the combination, with an inclosing sheath, of a plurality of cores of insulating material, electric conductors forming one or more circuits arranged upon each core, and insulating material outside said conductors binding each of said cores and the conductors thereon together, said cores being constructed to provide space for dry-air insulation between the conductors, substantially as described.

8. An electric cable consisting of an inclosing sheath and a plurality of single-strand electric circuits, each single strand consisting of a core of insulating material and one or more circuits thereon, each circuit consisting of a pair of conductors arranged in position upon opposite sides of said core, and a covering of insulating material binding said conductors and core together, said cores being constructed to provide space for dry-air insulation between the conductors, substantially as described.

In testimony whereof I have hereunto set my hand in the presence of two subscribing witnesses.

JOHN A. BARRETT.

Witnesses:
JEROME B. BROMLEY,
W. C. MOULTON.